(12) United States Patent
Wilkie

(10) Patent No.: US 10,196,283 B2
(45) Date of Patent: Feb. 5, 2019

(54) EROSION AND STORM WATER CONTROL APPARATUS AND METHOD

(71) Applicant: Granite Environmental, Inc., Sebastian, FL (US)

(72) Inventor: Mark Wilkie, Sebastian, FL (US)

(73) Assignee: Granite Environmental, Inc., Sebastian, FL (US)

( * ) Notice: Subject to any disclaimer, the term of this patent is extended or adjusted under 35 U.S.C. 154(b) by 3 days.

(21) Appl. No.: 15/251,002

(22) Filed: Aug. 30, 2016

(65) Prior Publication Data

US 2017/0057832 A1 Mar. 2, 2017

Related U.S. Application Data

(60) Provisional application No. 62/212,587, filed on Aug. 31, 2015.

(51) Int. Cl.

| | |
|---|---|
| *E02B 3/04* | (2006.01) |
| *C02F 1/00* | (2006.01) |
| *E02B 3/10* | (2006.01) |
| *C02F 103/00* | (2006.01) |
| *E03F 5/14* | (2006.01) |
| *C02F 1/28* | (2006.01) |
| *C02F 1/52* | (2006.01) |
| *C02F 101/20* | (2006.01) |
| *C02F 101/32* | (2006.01) |

(52) U.S. Cl.
CPC ............... *C02F 1/004* (2013.01); *E02B 3/04* (2013.01); *E02B 3/106* (2013.01); *C02F 1/283* (2013.01); *C02F 1/52* (2013.01); *C02F 2101/20* (2013.01); *C02F 2101/32* (2013.01); *C02F 2103/001* (2013.01); *E02B 3/104* (2013.01); *E03F 5/14* (2013.01); *Y02A 10/13* (2018.01)

(58) Field of Classification Search
CPC ... E02B 3/023; E02B 3/04; E02B 3/10; E02B 3/104; E02B 3/106; E02B 3/108; C02F 2103/001
USPC ...... 210/747.3, 170.03; 405/15, 302.4, 302.6, 405/302.7
See application file for complete search history.

(56) References Cited

U.S. PATENT DOCUMENTS

| | | | | |
|---|---|---|---|---|
| 5,658,096 | A * | 8/1997 | Von Kanel | .......... E02D 29/0208 405/302.4 |
| 6,379,543 | B1 * | 4/2002 | Bowman | .............. B01D 24/007 210/170.03 |

(Continued)

*Primary Examiner* — Christopher Upton
(74) *Attorney, Agent, or Firm* — Stephen C. Thomas

(57) ABSTRACT

In accordance with one embodiment of the present invention, the invention is an erosion and storm water control apparatus comprising a hopper portion, an upstream apron, and a downstream apron. The hopper portion may be fabricated from permeable filter fabric and is aided in remaining open by gussets that may be comprised of fabric or other material. The hopper may comprise a self-rising upper edge. The upstream apron may comprise pockets that may be filled with dirt, rocks or the like, and may be buried in an upstream trench, in order to hold the erosion and storm water control apparatus in place during a runoff event, such as during or directly after a thunderstorm. The downstream apron may be fabricated from impervious membrane for anchoring with adhesive, staples, stakes, weights or the like. The invention may comprise handles to assist in the removal of debris and sediment.

19 Claims, 24 Drawing Sheets

(56) References Cited

U.S. PATENT DOCUMENTS

| | | | | |
|---|---|---|---|---|
| 6,672,799 | B2* | 1/2004 | Earl | E02B 3/04 |
| | | | | 405/15 |
| 6,692,188 | B1* | 2/2004 | Walker | E02B 3/106 |
| | | | | 405/115 |
| 7,125,487 | B1* | 10/2006 | Kaufmann | B01D 19/0031 |
| | | | | 210/170.03 |
| 7,422,682 | B2* | 9/2008 | McPhillips | E02B 3/125 |
| | | | | 210/170.03 |
| 7,431,533 | B1* | 10/2008 | Oda | E02B 3/104 |
| | | | | 405/16 |
| 7,544,016 | B2* | 6/2009 | McGinn | E02B 3/04 |
| | | | | 210/170.03 |
| 9,562,350 | B1* | 2/2017 | Witt | E02B 3/023 |
| 2005/0286982 | A1* | 12/2005 | Olafsson | E01F 7/04 |
| | | | | 405/302.6 |
| 2007/0003369 | A1* | 1/2007 | Hanson | E02B 3/04 |
| | | | | 405/15 |
| 2008/0157044 | A1* | 7/2008 | Barfield | E02B 3/04 |
| | | | | 256/12.5 |
| 2017/0051491 | A1* | 2/2017 | Wilkie | E03F 5/0404 |

\* cited by examiner

Beltech 4 x 6

Product Data Sheet
July 2013

A woven geotextile fabric, produced from polypropylene slit-film tapes, which will meet or exceed the following MARV's. This fabric is produced for use in Filtration and Dewatering application. Its sand color makes it more appealing than traditional black fabrics in many applications.

| Property | Test Method | English Units | | | SI Units | | |
|---|---|---|---|---|---|---|---|
| | | MARV | | | MARV | | |
| | | MD | CD | | MD | CD | |
| Grab Tensile Strength - Typical | ASTM D-4632 | 600 | 700 | lbs | 2670 | 3115 | N |
| Grab Tensile Elongation - Typical | ASTM D-4632 | 20 | 15 | % | 20 | 15 | % |
| Wide Width Tensile Ultimate | ASTM D-4595 | 400 | 600 | lbs/in | 70 | 105 | kN/m |
| Wide Width Elongation | ASTM D-4595 | 17 | 13 | % | 17 | 13 | % |
| Wide Width @ 2% - Typical | ASTM D-4595 | 25 * | 130 * | lbs/in | 4.4 * | 22.8 * | kN/m |
| Wide Width @ 5% - Typical | ASTM D-4595 | 90 * | 300 * | lbs/in | 15.8 * | 52.5 * | kN/m |
| Trapezoid Tear | ASTM D-4533 | 280 | 300 | lbs | 1246 | 1335 | N |
| "CBR" Puncture - Typical | ASTM D-6241 | 2950 * | | lbs | 13.1 * | | kN |
| Puncture | ASTM D-4833 | 250 | | lbs | 1113 | | N |
| Permittivity | ASTM D-4491 | 0.260 | | sec$^{-1}$ | 0.260 | | sec$^{-1}$ |
| A.O.S. | ASTM D-4751 | 40 | | U.S. Sieve | 0.425 | | mm |
| UV Resistance (1200 hrs) - Typical | ASTM D-4355 | 85 | | % | 85 | | % |
| UV Resistance (1200 hrs) - MARV | ASTM D-4355 | 70 | | % | 70 | | % |
| Water Flow Rate | ASTM D-4491 | 20 | | gpm/ft$^2$ | 815 | | l/min/m$^2$ |
| Pore Size Distribution (O$_{95}$) ** | ASTM D-6767 | ~ 175 * | | U.S. Sieve | 85 * | | micron |
| Pore Size Distribution (O$_{50}$) ** | ASTM D-6767 | ~ 50 * | | U.S. Sieve | 307 * | | micron |

\* Typical value rather than MARV
\*\* Performed by TRI Environmental, Austin Texas

Fig. 17

P.O. Box 640
1890 Springhead Ch. Rd.
Willacoochee, Ga. 31650

912-534-6071
800-948-7870
912-534-6254(fax)

Subject: LM 2199

LM 2119 is manufactured using high tenacity polypropylene yarns that are woven to form a dimensionally stable network, which allows the yarns to maintain their relative position. LM 2119 resists ultraviolet deterioration, rotting and biological degradation and is inert to commonly encountered soil chemicals. LM 2199 will satisfy the requirements as outlined in AASHTO M-288-06 for Permanent Erosion Control & Subsurface Drainage Class 3.

| PROPERTY | TEST METHOD | MARV ENGLISH | MARV METRIC |
|---|---|---|---|
| Tensile Strength (Grab) | ASTM D-4632 | 370 x 250 lbs | 1647 x 1113 N |
| Elongation | ASTM D-4632 | 15% | 15% |
| Puncture | ASTM D-4833 | 120 lbs | 534 N |
| Mullen Burst | ASTM D-3786 | 450 psi | 3100 kPa |
| Trapezoidal Tear | ASTM D-4533 | 100 x 60 lbs | 445 x 267 N |
| UV Resistance (at 500 hrs) | ASTM D-4355 | 90% | 90% |
| Apparent Opening Size (AOS)* | ASTM D-4751 | 70 US Std. Sieve | 0.212 mm |
| Percent Open Area (POA) | COE-02215 | 4% | 4% |
| Permittivity | ASTM D-4491 | 0.28 sec$^{-1}$ | 0.28 sec$^{-1}$ |
| Water Flow Rate | ASTM D-4491 | 18 gpm/ft$^2$ | 733 l/min/m$^2$ |
| Roll Sizes | | 6' x 300'<br>12' x 300' | 1.83 m x 91.5 m<br>3.65 m x 91.5 m |

Unless otherwise noted, this certification is based on testing conducted by our Quality Assurance & Quality Control testing laboratories at the time of manufacturing. L & M Supply Co., Inc. issued this letter of certification to indicate our commitment to providing our customers with a quality product which will meet or exceed the minimum average roll values in accordance with the applicable American Society for Testing and Materials (ASTM) test method.

Fig. 18

LM 2404

LM 2404 is manufactured using high tenacity polypropylene yarns that are woven to form a dimensionally stable network, which allows the yarns to maintain their relative position.
LM 2404 resists ultraviolet deterioration, rotting, and biological degradation and is inert to commonly encountered soil chemicals.

| PROPERTY | TEST METHOD | MARV English | MARV Metric |
|---|---|---|---|
| Tensile Strength (Grab) | ASTM D-4632 | 400 x 315 lbs | 1780 x 1402 N |
| Elongation | ASTM D-4632 | 15% | 15% |
| CBR Puncture | ASTM D-6241 | 1150 lbs | 5118 N |
| Trapezoidal Tear | ASTM D-4533 | 150 x 165 lbs | 668 x 734 N |
| Wide Width Tensile | ASTM D-4595 | 3000 x 2760 lbs | 13.34 x 12.28 kN |
| UV Resistance (at 500 hrs) | ASTM D-4355 | 90% | 90% |
| Apparent Opening Size (AOS)* | ASTM D-4751 | 40 US Std. Sieve | 0.425 mm |
| Percent Open Area (POA) | COE-02215 | 1% | 1% |
| Permittivity | ASTM D-4491 | 0.90 sec⁻¹ | 0.90 sec⁻¹ |
| Permeability | ASTM D4491 | .07 cm/sec | .07 cm/sec |
| Water Flow Rate | ASTM D-4491 | 70 gpm/ft² | 2852 l/min/m² |

*Maximum Average Roll Value

Notes:
* Mullen Burst ASTM D-3786 has been removed. It is not recognized by ASTM D-35 for Geosynthetics.
* Puncture ASTM D-4833 has been removed. It is not recognized by AASHTO M288 and has been replaced with CBR Puncture ASTM D-6241

| PROPERTY | Typical English | Typical Metric |
|---|---|---|
| Roll Dimensions | 15 x 300 ft | 4.6 x 91.5 m |
| Roll Area | 500 yd² | 418 m² |

Fig. 19

Mirafi® 160N

Data for Comparison

Mirafi® 160N is a needlepunched nonwoven geotextile composed of polypropylene fibers, which are formed into a stable network such that the fibers retain their relative position. Mirafi® 160N is inert to biological degradation and resists naturally encountered chemicals, alkalis, and acids. Mirafi® 160N meets Aashto M288-06 Class 2 for elongation >50%. TenCate Geosynthetics Americas is accredited by a2La (The American Association for Laboratory Accreditation) and Geosynthetic Accreditation Institute – Laboratory Accreditation Program (GAI-LAP). This data sheet for Mirafi® 160N is provided for comparison purposes only.

| PROPERTY | TEST METHOD | ENGLISH | METRIC |
|---|---|---|---|
| Weight – Typical | ASTM D-5261 | 6.0 oz/sy | 203 g/sm |
| Tensile Strength | ASTM D-4632 | 160 lbs | 712 N |
| Elongation @ Break | ASTM D-4632 | 50% | 50% |
| CBR Puncture | ASTM D-6241 | 410 lbs | 1,825 N |
| Trapezoidal Tear | ASTM D-4533 | 60 lbs | 300 N |
| Apparent Opening Size | ASTM D-4751 | 70 US Sieve | .212 mm |
| Permittivity | ASTM D-4491 | 1.50 Sec-1 | 1.50 Sec-1 |
| Water Flow Rate | ASTM D-4491 | 110 g/min/sf | 4,481 l/min/sm |
| UV Resistance @ 500 Hours | ASTM D-4355 | 70% | 70% |

Fig. 20

Mirafi® FW 300

Data for Comparison

Mirafi® FW 300 geotextile is composed of polypropylene yarns, which are woven into a stable network such that the yarns retain their relative position. Mirafi® FW 300 geotextile is inert to biological degradation and resists naturally encountered chemicals, alkalis, and acids. TenCate Geosynthetics Americas is accredited by a2La (The American Association for Laboratory Accreditation) and Geosynthetic Accreditation Institute – Laboratory Accreditation Program (GAI-LAP). This data sheet for Mirafi® FW 300 is provided for comparison purposes only.

| PROPERTY | TEST METHOD | ENGLISH | METRIC |
|---|---|---|---|
| Weight – Typical | ASTM D-5261 | 8.4 oz/sy | 285 g/sm |
| Tensile Strength | ASTM D-4632 | 400 x 335 lbs | 1,780 x 1,491 N |
| Elongation @ Break | ASTM D-4632 | 20 x 15% | 20 x 15% |
| Thickness – Typical | ASTM D-5199 | 35 mils | 0.90 mm |
| Wide Width Tensile | ASTM D-4595 | 2,760 x 2,700 lbs/ft | 40.3 x 39.4 kN/m |
| CBR Puncture | ASTM D-6241 | 1,250 lbs | 5,563 N |
| Trapezoidal Tear | ASTM D-4533 | 145 x 125 lbs | 645 x 556 N |
| Apparent Opening Size | ASTM D-4751 | 30 US Sieve | .600 mm |
| Permittivity | ASTM D-4491 | 1.50 Sec-1 | 1.50 Sec-1 |
| Permeability | ASTM D-4491 | 0.13 cm/sec | 0.13 cm/sec |
| Water Flow Rate | ASTM D-4491 | 115 g/min/sf | 4,685 l/min/sm |
| Percent Open Area | CW-02215 | 8% | 8% |
| UV Resistance @ 500 Hours | ASTM D-4355 | 90% | 90% |

Fig. 21

Mirafi® FW 403

Data For Comparison

Mirafi® FW 403 geotextile is composed of high-tenacity monofilament polypropylene yarns, which are woven into a stable network such that the yarns retain their relative position. Mirafi® FW 403 geotextile is inert to biological degradation and resists naturally encountered chemicals, alkalis, and acids. TenCate Geosynthetics Americas is accredited by a2La (The American Association for Laboratory Accreditation) and Geosynthetic Accreditation Institute – Laboratory Accreditation Program (GAI-LAP). This data sheet for Mirafi® FW 403 is provided for comparison purposes only.

| PROPERTY | TEST METHOD | ENGLISH | METRIC |
|---|---|---|---|
| Weight – Typical | ASTM D-5261 | 8.8 oz/sy | 298 g/sm |
| Thickness – Typical | ASTM D-5199 | 20 mils | 0.50 mm |
| Tensile Strength | ASTM D-4632 | 425 x 350 lbs | 1,891 x 1,558 N |
| Elongation @ Break | ASTM D-4632 | 21 x 21% | 21 x 21% |
| Wide Width Tensile | ASTM D-4595 | 3,240 x 2,700 lbs/ft (270 x 225 lbs/in) | 47.3 x 39.4 kN/m |
| CBR Puncture | ASTM D-6241 | 1,340 lbs | 5,963 N |
| Trapezoidal Tear | ASTM D-4533 | 145 x 125 lbs | 645 x 556 N |
| Apparent Opening Size | ASTM D-4751 | 40 US Sieve | .43 mm |
| Permittivity | ASTM D-4491 | 0.96 Sec-1 | 0.96 Sec-1 |
| Permeability | ASTM D-4491 | .046 cm/sec | .046 cm/sec |
| Water Flow Rate | ASTM D-4491 | 70 g/min/sf | 2,852 l/min/sm |
| Percent Open Area | CW-02215 | 6% | 6% |
| UV Resistance @ 500 Hours | ASTM D-4355 | 90% | 90% |

Fig. 22

Mirafi® 140NL

Data for Comparison

Mirafi® 140NL is a needlepunched nonwoven geotextile composed of polypropylene fibers, which are formed into a stable network such that the fibers retain their relative position. Mirafi® 140NL is inert to biological degradation and resists naturally encountered chemicals, alkalis, and acids. TenCate Geosynthetics Americas is accredited by a2La (The American Association for Laboratory Accreditation) and Geosynthetic Accreditation Institute – Laboratory Accreditation Program (GAI-LAP). This data sheet for Mirafi® 140NL is provided for comparison purposes only.

| PROPERTY | TEST METHOD | ENGLISH | METRIC |
|---|---|---|---|
| Weight – Typical | ASTM D-5261 | 3.5 oz/sy | 119 g/sm |
| Tensile Strength | ASTM D-4632 | 90 lbs | 401 N |
| Elongation @ Break | ASTM D-4632 | 50% | 50% |
| CBR Puncture | ASTM D-6241 | 250 lbs | 1,113 N |
| Trapezoidal Tear | ASTM D-4533 | 40 lbs | 178 N |
| Apparent Opening Size | ASTM D-4751 | 50 US Sieve | .30 mm |
| Permittivity | ASTM D-4491 | 2.00 Sec-1 | 2.00 Sec-1 |
| Water Flow Rate | ASTM D-4491 | 145 g/min/sf | 5,907 l/min/sm |
| UV Resistance @ 500 Hours | ASTM D-4355 | 70% | 70% |

Fig. 23

Mirafi® 180N is a needlepunched nonwoven geotextile composed of polypropylene fibers, which are formed into a stable network such that the fibers retain their relative position. Mirafi® 180N is inert to biological degradation and resists naturally encountered chemicals, alkalis, and acids. Mirafi® 180N meets AASHTO M288-06 Class 1 for Elongation > 50%.

TenCate Geosynthetics Americas Laboratories are accredited by a2La (The American Association for Laboratory Accreditation) and Geosynthetic Accreditation Institute – Laboratory Accreditation Program (GAI-LAP). NTPEP Listed

| Mechanical Properties | Test Method | Unit | Minimum Average Roll Value | |
|---|---|---|---|---|
| | | | MD | CD |
| Grab Tensile Strength | ASTM D4632 | lbs (N) | 205 (912) | 205 (912) |
| Grab Tensile Elongation | ASTM D4632 | % | 50 | 50 |
| Trapezoid Tear Strength | ASTM D4533 | lbs (N) | 80 (356) | 80 (356) |
| CBR Puncture Strength | ASTM D6241 | lbs (N) | 500 (2224) | |
| | | | Maximum Opening Size | |
| Apparent Opening Size (AOS) | ASTM D4751 | U.S. Sieve (mm) | 80 (0.18) | |
| | | | Minimum Roll Value | |
| Permittivity | ASTM D4491 | sec⁻¹ | 1.4 | |
| Flow Rate | ASTM D4491 | gal/min/ft² (l/min/m²) | 95 (3870) | |
| | | | Minimum Test Value | |
| UV Resistance (at 500 hours) | ASTM D4355 | % strength retained | 70 | |

| Physical Properties | Unit | Roll Sizes | |
|---|---|---|---|
| Roll Dimensions (width x length) | ft (m) | 12.5 x 360 (3.8 x 110) | 15 x 300 (4.57 x 91.4) |
| Roll Area | yd² (m²) | 500 (418) | |

Fig. 24

Mirafi® FW500

Mirafi® FW500 geotextile is composed of high-tenacity monofilament and slit tape polypropylene yarns, which are woven into a stable network such that the yarns retain their relative position. Mirafi® FW500 geotextile is inert to biological degradation and resists naturally encountered chemicals, alkalis, and acids.

| Mechanical Properties | Test Method | Unit | Minimum Average Roll Value | |
|---|---|---|---|---|
| | | | MD | CD |
| Wide Width Tensile Strength | ASTM D4595 | kN/m (lbs/in) | 32.1 (183) | 43.8 (250) |
| Grab Tensile Strength | ASTM D4632 | N (lbs) | 1446 (325) | 1891 (425) |
| Grab Tensile Elongation | ASTM D4632 | % | 15 | 15 |
| Trapezoid Tear Strength | ASTM D4533 | N (lbs) | 601 (135) | 668 (150) |
| CBR Puncture Strength | ASTM D6241 | N (lbs) | 4450 (1000) | |
| Apparent Opening Size (AOS)[1] | ASTM D4751 | mm (U.S. Sieve) | 0.30 (50) | |
| Percent Open Area | COE-02215 | % | 4 | |
| Permittivity | ASTM D4491 | sec$^{-1}$ | 0.51 | |
| Permeability | ASTM D4491 | cm/sec | 0.027 | |
| Flow Rate | ASTM D4491 | l/min/m$^2$ (gal/min/ft$^2$) | 1426 (35) | |
| UV Resistance (at 500 hours) | ASTM D4355 | % strength retained | 70 | |

[1] ASTM D 4751: AOS is a Maximum Opening Diameter Value

| Physical Properties | Test Method | Unit | Typical Value |
|---|---|---|---|
| Mass/Unit Area | ASTM D5261 | g/m$^2$ (oz/yd$^2$) | 271 (8.0) |
| Thickness | ASTM D5199 | mm (mils) | 0.9 (35) |
| Roll Dimensions (width x length) | -- | m (ft) | 3.7 (12) x 91 (300) |
| Roll Area | -- | m$^2$ (yd$^2$) | 334 (400) |
| Estimated Roll Weight | --- | kg (lbs) | 96 (212) |

Fig. 25

EROSION AND STORM WATER CONTROL APPARATUS AND METHOD

CROSS REFERENCE TO RELATED APPLICATIONS AND INCORPORATION BY REFERENCE

This non provisional patent application claims benefit of priority to U.S. provisional patent application Ser. No. 62/212,587, titled EROSION AND STORM WATER CONTROL APPARATUS AND METHOD, filed in the United States Patent and Trademark Office on Aug. 31, 2015, which is hereby incorporated in its entirety by reference.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISK

Not applicable.

BACKGROUND OF THE INVENTION

1. Field of the Invention

The field of the invention relates generally to systems and methods for preventing erosion from a construction site, roadway or other area; and the field of the invention also relates generally to preventing sediment and unwanted materials, such as dirt and debris, from being washed from an outdoor surface such as a construction site, field, swale, or other outdoor surface and into the surrounding environment as may occur, for example, when a construction site or other outdoor surface experiences storm water runoff.

2. Background Art

Construction sites, roadways, parking lots, and other similar structures generally comprise large, relatively flat exterior areas that are exposed to precipitation in any of its forms. These areas may act as collectors for precipitation in the form of rain, ice, sleet, and snow; and, when precipitation occurs, it may exit the area in the form of storm water runoff. It is generally desirable to prevent storm water from eroding the soil and other ground surface elements of such a site.

It is also especially desirable in certain construction projects, such as, for example, housing construction, commercial construction, road construction, and any other construction that sediment and other unwanted foreign objects or material resulting from such construction activities, and the contaminants they may contain, be prevented from entering the local environment. Storm water draining from construction sites or major roadways often contains suspended sediments when sheet runoff occurs. This is especially true when rain encounters open soil. The storm water can also carry with it debris and a variety of other pollutants such as, for example, metals, hydrocarbons, oils, and other unwanted substances. When storm water runoff containing such unwanted substances enters a ditch, culvert or swale unimpeded, it transfers all these pollutants into the local environment, where they can disturb ecosystems and negatively affect water quality. In some jurisdictions, this can result in significant monetary fines and other penalties fines due to non-compliance with local, state and federal regulations. The storm water flow can also cause a great deal of soil erosion on a construction site and in the surrounding areas. There is a need for an erosion control apparatus that permits the flow of water such as storm water through a ditch, culvert or swale without carrying the sediment and other contaminants along with the water. The desired erosion control apparatus should slow the water's momentum, allowing for sediment settling and the reduction of surface erosion.

Traditional methods used to achieve this have included hay bales, silt fences and coir logs to prevent or impede storm water runoff. However, these methods of the prior art exhibit drawbacks, leaving a need in the art. Hay bales may be placed in areas of runoff to act as a barrier, but they ineffectively impede runoff because the gaps between them allow water to escape. Also, deploying hay bales can be labor and time intensive. They also deteriorate quickly and can leave straw in drains and filters, posing a clogging hazard.

Silt fences have also been used, again with limited success, leaving a need for a better solution. Some state governments do not recommend using silt fences for heavy storm water flow areas because of their lack of structural integrity, which may cause them to fail structurally under the weight and pressure of the storm water runoff. Also, silt fences bear the force of the runoff directly without any distribution of pressure along the fence, again causing them to fail structurally when they are subjected to storm water runoff that exhibits uneven fluid flow.

What is needed in the art, therefore, is an apparatus and/or method adapted to be used in construction sites and the like that prevents the egress of unwanted debris, sediment, pollutants, trash, yard waste, garbage, foreign objects or other unwanted matter from an area, but still allows fluids such as storm water runoff to pass through and to drain relatively unimpeded.

BRIEF SUMMARY OF THE INVENTION

The present erosion and storm water control apparatus and method of the invention comprises an apparatus and method that have one or more of the following features and/or steps, which alone or in any combination may comprise patentable subject matter.

The present invention overcomes the shortcomings of the prior art in that it is an erosion control and storm water runoff filter adapted to be used in conjunction with an installation ditch, that operates to prevent the egress of unwanted debris, sediment, hydrocarbons, pollutants, trash, yard waste, garbage, foreign objects or other matter from a construction site, roadway, or other area that may be subject to erosion or storm water runoff.

This device is a fabric filter bag that may, for example, be installed longitudinally across a ditch, swale, culvert or other area that is subject to water runoff. Designed to control erosion and the flow of waterborne sediment and pollutants, the device may be fabricated from a variety of fabrics, including woven and non-woven monofilament polypropylene. The erosion and storm water control apparatus and method design allows it to slow the speed of water or other fluid passing through it, and, at the same time, filter out particles of all sizes, from sand to mid-sized debris. The erosion and storm water control apparatus and method design may further comprise activated carbon, chitosan, flocculants, coagulants, polymers, adsorbents and absorbent media to aid in filtering and/or treating the water flowing through it. A top edge of the invention spans the front of the device may comprise a buoyancy apparatus sewn into the fabric, facilitating self-rising action as water enters the invention.

The erosion and storm water control apparatus and method design may further comprise a hopper that is divided up into cells with vertical lengths of fabric separating the cells and also acting as a supporting framework, or gusset, to aid in keeping the invention in an open position and ready to accept a flow of fluid. Openings, or overflow ports, in the top of the invention allow for overflow when the Ditch Check reaches capacity water flow.

There are at least two basic methods of securing the device, depending on the ground surface upon which the erosion and storm water control apparatus is installed. When installed on asphalt or other hard surfaces, the device may comprise an apron on the upstream side made of impervious membrane for anchoring with fasteners, chemical bonding, adhesive, staples or weights. On other surfaces, a geotextile apron may have attachment points designated to accept stakes for anchoring to the soil in order to keep the device firmly anchored during a period of fluid flow such as storm water runoff during or immediately after a rain storm or other precipitation. Integrated pockets on the upstream geotextile apron are adapted to be filled with gravel or other materials to help retain the device in place by acting as weights, in an anchor trench.

The invention's structure allows for fluid flow between the individual cells so that one cell of the device is not overly stressed by unevenly distributed fluid flow, such as may be experienced with simple silt fences. This feature acts to prevent localized points of failure during a runoff event by distributing the forces on the invention due to fluid flow.

Maintenance guidelines in many jurisdictions require that sediment and debris buildup be removed when they reach 50 percent of the erosion control device's height. Coir logs are only about 12 inches high, which means the sediment must be removed once it reaches 6 inches in height. In an embodiment of the invention, the height of the invention may be at least 18 inches, requiring that it be serviced less often than the coir logs of the prior art. However the height of the invention may be any height desired by the user and is not limited to at least 18 inches. This sizing of the height of the invention will be determined by parameters of the intended use, such as, for example, the size of the swale, drainage pipe or overall height of the receiving water. To avoid a flooding situation, the height of the erosion and storm water control apparatus is not to exceed 80 percent of the receiving water and is also limited by anchoring ability.

In a preferred embodiment, the erosion and storm water control apparatus is a horizontal, low-profile fabric structure, open on one side that accepts water flow, designed to control erosion and filter out contaminants in sheet flow and ditch or swale runoff. A supporting mechanism surrounded by fabric runs along the top of the device. The supporting mechanism is made of polyethylene foam or other material that is less dense than water, that aids the device in retaining its shape, allowing water to flow into the hopper without allowing the hopper to collapse. Because of the buoyancy properties of the supporting mechanism, the top of the device is self-rising; the opening expands with the inflow of water into the hopper. The rigidity of the fabric inside the hopper, particularly the vertical gusset fabric separating the sections, helps hold the invention open and allows for easy removal of the collected pollutants via a shovel or broom.

The device's fabric can be either a woven or non-woven textile made from monofilament or slit film, or fiber yarns. The invention is customizable, allowing for such auxiliary mechanisms as extra-absorbent pillows, pads or other structures to be sewn into the hopper and to be subject to the water flow through the invention. The pillows may comprise flocculants, coagulants, extra activated charcoal filters, heavy metal filters and hydrocarbon filters as desired by the user for a particular application. The erosion and storm water control apparatus lies relatively flat when there is no active flow of water.

Overflow ports, which may be disposed along an upper surface of the erosion and storm water control apparatus, help to preclude overflow or pooling of storm water. If the filter bag fills up, water will flow through the overflow ports and over the device. The erosion and storm water control apparatus may be fabricated in a variety of colors as an optional safety feature, and for enhanced visibility.

An apron of fabric disposed on a lower portion of the erosion and storm water control apparatus maybe located on the input, or upstream, side of the device and may be buried in the soil or other surrounding material to keep water from flowing underneath the device and to assist in anchoring the device in place. The apron may include integrated pockets that are adapted to receive sand, gravel or other material for additional support, by way of acting as anchor weights.

In a typical installation that is not on a hard surface, a trench, which may be, for example, 6 inches deep and 4 inches across, may be created in order to accept the apron. The invention may further comprise an apron on its downstream side. Stakes similar to those used in anchoring silt fences may be driven through designated points on the downstream side apron to secure the device. When deploying on asphalt or other hard surface, an impervious membrane apron is used instead and can be fastened with staples, adhesive or weights. The anchoring of impervious membrane may comprise, as an example, a 3-to-1 ratio length-to-height for standard apron and can be adjusted based on environment, although any ratio may comprise the invention. A loop handle may be sewn into the downstream apron in the middle of each cell so workers can lift successive portions of the device and dump the sediment upstream, facilitating cleanup and maintenance.

Most devices that receive runoff address the need for either filtration or controlling water velocity, but not both. The erosion and storm water control apparatus of the invention provide the advantage of offering both functions. While other erosion control products are easy to disturb and damage, requiring special checks after an incident, the erosion and storm water control apparatus of the invention lies relatively flat when no flow is present, depending on how much debris has collected during flow events.

In accordance with one embodiment of the present invention, the invention is an erosion and storm water control apparatus comprising a hopper portion, an upstream apron, and a downstream apron. The hopper portion may be fabricated from permeable filter fabric and is aided in remaining open by gussets that may be comprised of fabric or other material. The gussets may operate as a velocity-reducing baffle to reduce the velocity of parallel water flow, thus increasing the capture of debris and settlement by the invention during a storm water runoff event. The hopper may comprise a self-rising upper leading edge that is comprised of a lighter-than-water support member which may be disposed in a pocket of hopper upper panel or attached to hopper upper panel by any means known in the art. The upstream apron may comprise pockets that may be filled with dirt, rocks or the like, and may be buried in an upstream trench, in order to hold the erosion and storm water control apparatus in place during a runoff event, such as during or directly after a thunderstorm. The downstream apron may be fabricated from impervious membrane for anchoring with adhesive, staples, stakes, weights or the like. The invention may comprise handles to assist in the removal of debris and sediment.

The present method and device of the invention overcome the shortcomings of the prior art by controlling erosion; preventing the egress of unwanted debris, sediment, hydrocarbons, foreign objects or other unwanted matter from storm water runoff; providing a control of runoff water velocity; allowing for the use of filter materials such as flocculants, coagulants, extra activated charcoal filters, heavy metal filters and hydrocarbon filters as desired by the user for a particular application; providing an erosion control system that is not susceptible to collapse during a runoff event as are systems of the prior art; and lying relatively flat so that it is not any eyesore to the site, and it will generally not be damaged by traffic.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating the preferred embodiments of the invention and are not to be construed as limiting the invention. In the drawings:

FIG. 17 depicts a data sheet showing material characteristics of BELTECH 4×6 permeable filter fabric material.

FIG. 18 depicts a data sheet showing material characteristics of LM 2199 permeable filter fabric material.

FIG. 19 depicts a data sheet showing material characteristics of LM 2404 permeable filter fabric material.

FIG. 20 depicts a data sheet showing material characteristics of 160N permeable filter fabric material.

FIG. 21 depicts a data sheet showing material characteristics of FW 300 permeable filter fabric material.

FIG. 22 depicts a data sheet showing material characteristics of FW 403 permeable filter fabric material.

FIG. 23 depicts a data sheet showing material characteristics of 140 NL permeable filter fabric material.

FIG. 24 depicts a data sheet showing material characteristics of 180N permeable filter fabric material.

FIG. 25 depicts a data sheet showing material characteristics of FW500 permeable filter fabric material.

DETAILED DESCRIPTION OF THE INVENTION

Figure 1:
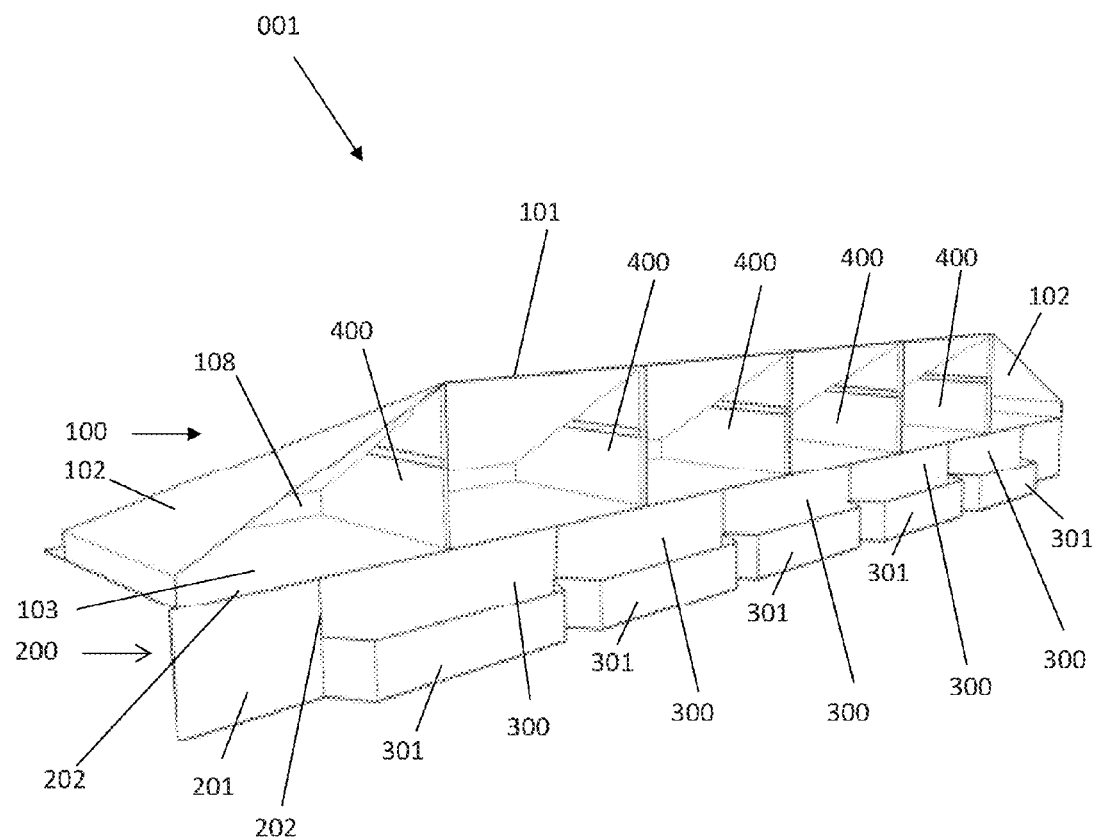
FIG. 1 depicts a perspective front view of the erosion and storm water control apparatus of the invention.
Figure 2:
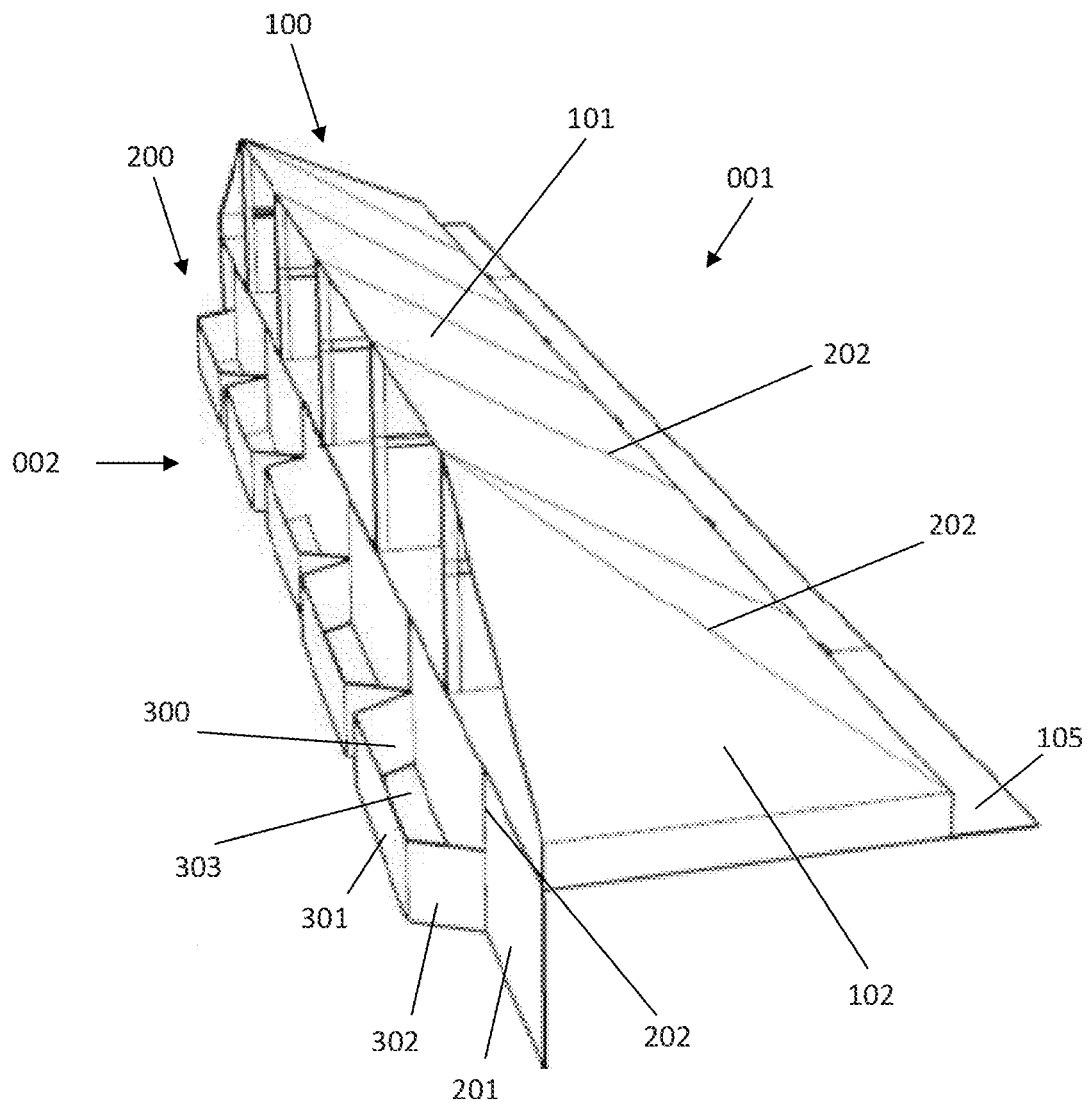
FIG. 2 depicts a perspective side view of the erosion and storm water control apparatus of the invention.
Figure 3:
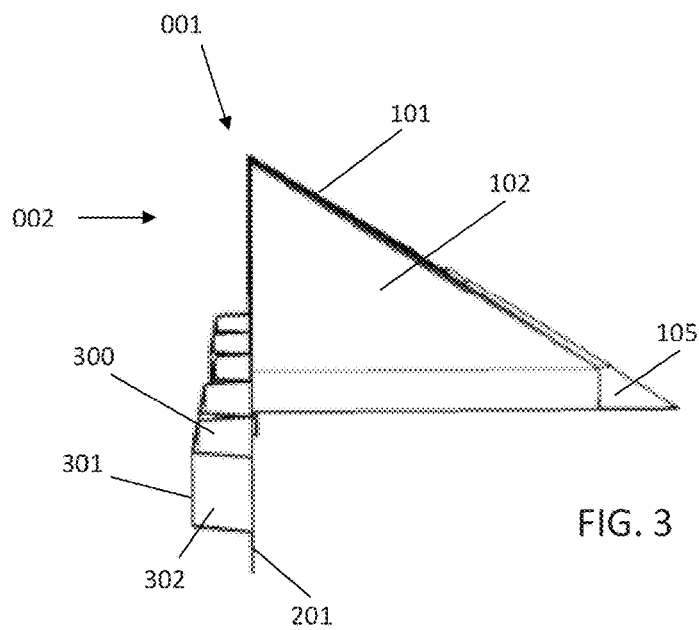
FIG. 3 depicts an orthogonal side view of the erosion and storm water control apparatus of the invention.
Figure 4:
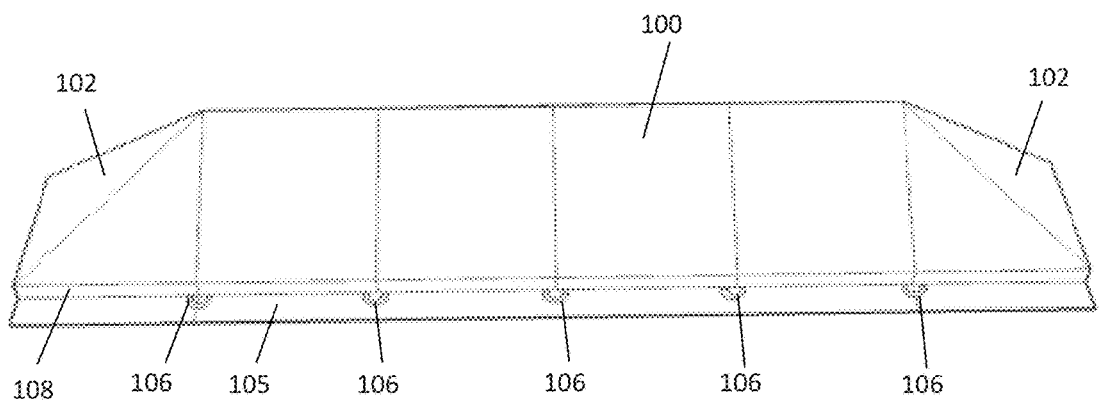
FIG. 4 depicts a perspective rear view of the erosion and storm water control apparatus of the invention.
Figure 5:
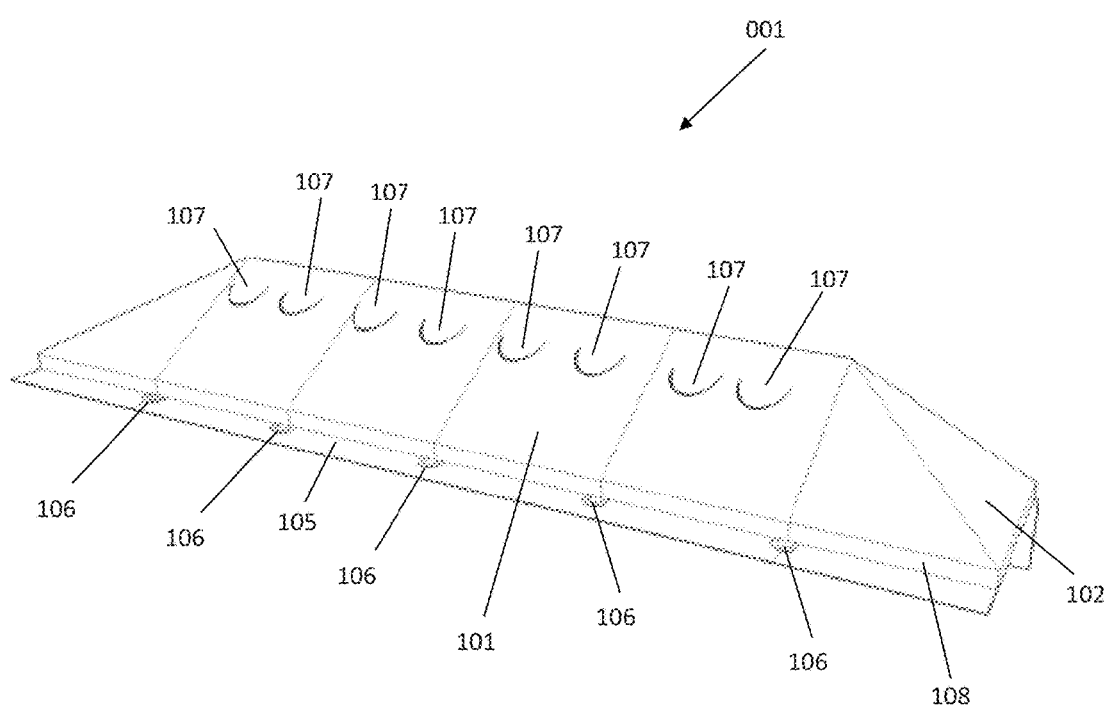
FIG. 5 depicts a perspective view of the erosion and storm water control apparatus of the invention from the rear and top.
Figure 6:
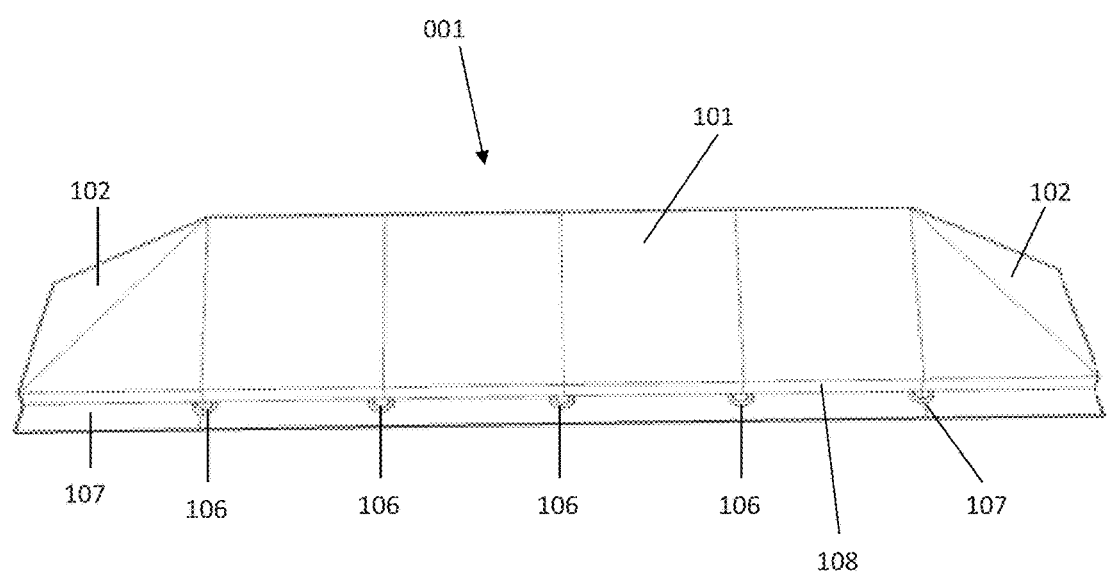
FIG. 6 depicts a perspective rear view of the erosion and storm water control apparatus of the invention.

The following documentation provides a detailed description of the invention.

Although a detailed description as provided in the attachments contains many specifics for the purposes of illustration, anyone of ordinary skill in the art will appreciate that many variations and alterations to the following details are within the scope of the invention. Accordingly, the following preferred embodiments of the invention are set forth without any loss of generality to, and without imposing limitations upon, the claimed invention. Thus the scope of the invention should be determined by the appended claims and their legal equivalents, and not merely by the preferred examples or embodiments given.

As referred to herein, "permeable filter fabric" means any water permeable fabric, such as, for example, a non-woven geotextile. As referred to herein, a non-woven geotextile allows water flow therethrough, including planar water flow. They are commonly known as filter fabrics, although woven monofilament geotextiles can also be referred to as filter fabrics. Typical applications for non-woven geotextiles include aggregate drains, asphalt pavement overlays and erosion control. As an example, such water permeable fabrics may be comprised of 4, 8, 10, or 12 oz. per square yard non-woven geotextile material, BELTON 4×6 geotextile, 140NL geotextile, 160N geotextile, 180N0 geotextile, FILTER MAT OC geotextile, FW404 geotextile, FW500 geotextile, FW300 geotextile, FW403 geotextile, LM 2199 geotextile or LM 2404 geotextile polypropylene yarn fabrics, in any combination. Data sheets for these exemplary materials are attached as FIGS. 17-25. While these materials are set forth herein as comprising the permeable filter fabric of the invention, it is within the scope of the claimed invention that any fabric may comprise the invention, and any permeable filter fabric may comprise the invention. Thus the scope of the invention is not limited to only those fabrics specifically set forth in FIGS. 17-25. Also, the erosion control filter of the invention may comprise any one or more different permeable filter fabric materials in any combination; it is therefore not necessary that the entire erosion control filter be comprised of a single type of permeable filter fabric material.

As used herein, V-shaped or U-shaped is utilized to refer to the cross sectional shape that the erosion and storm water control apparatus may take on when hopper upper panel and hopper lower panel are attached as shown in the figures of the drawings. In the drawings, the erosion and storm water control apparatus cross-sectional shape is shown in an exemplary V-shaped embodiment. However, it is within the scope of the invention as described and claimed herein that the cross-sectional shape may be V-shaped, U-shaped, rectangular or any other cross-sectional shape. The scope of the invention is not be construed as limited to a V-shaped cross section only.

Referring now to FIGS. 1-7B, an exemplary embodiment of erosion and storm water control apparatus of the invention is depicted. The curb inlet filter comprises a hopper 100, an upstream apron 201, and a downstream 105.

Hopper 100 may be comprised of hopper upper panel 101, hopper lower panel 103, hopper side panels 102, hopper back panel 108 and gussets 400. Hopper upper panel 101, which may be comprised of permeable filter fabric, may be attached either directly or indirectly to a hopper lower panel 103 and hopper side panel 102 as shown in the figures, both of which may also be comprised of permeable filter fabric portion. Hopper upper panel 101, hopper lower panel 103, hopper side panels 102 and hopper back panel 108 may be attached by any means known in the art such as, for example, stitching, heat welding, ultrasonic welding, chemical bonding or any other means known in the art. A hopper back 108 panel may be interposed between hopper upper panel 101 and hopper lower panel 103. Gussets 400, which may also be comprised of permeable filter fabric, may be disposed interiorly to hopper 100 as depicted in the figures, being attached at an upper seam to hopper upper panel 101 and being attached at a lower seam to hopper lower panel 103. Hopper 100 may comprise a self-rising upper leading edge that is comprised of a lighter-than-water support member 110 (see FIGS. 7A and 7B) which may be disposed in a pocket of hopper upper panel 101 or attached to hopper upper panel 101 by any means known in the art. Support member may be comprised of any material that is lighter than water and provides structural support for holding the upstream side of hopper 100 open, but is preferably fabricated from polyethylene foam material. Openings 107 which may be disposed in hopper upper panel 101 allow for water to pass through hopper upper panel 101 in heavy flow situations, as depicted in FIG. 7B.

Upstream apron 201 may comprise a front panel 201 and pockets 300 which are formed by attachment of pocket front panel 301 to upstream apron front panel 201. Front panel 201 and pocket front panel 301 may be fabricated from any material but is preferably fabricated from impervious membrane. Upstream apron front panel 201 may attach to hopper lower panel 103 by any means known in the art such as, for example, stitching, heat welding, ultrasonic welding, chemical bonding or any other means known in the art.

Downstream apron 105 may be attached to hopper lower panel 103 and hopper back panel 108 as shown in the figures by any means known in the art, and may further comprise mounting openings 106 which may comprise grommets in order to provide a secure, rigid opening for a stake or other object to pass through the openings 106 for securing the downstream apron 105 to a surface or structure as desired.

In an alternate embodiment the invention may further comprise additional filter media for the purpose of filtering specific unwanted materials such as hydrocarbons or some sediments. Such additional filter media may comprise absorbent or adsorbent pads or logs, flocculents, hydrophobic or oil-phylic materials, activated carbon, and/or polymers and may be disposed within the partially enclosed volume of hopper 100 by any means known in the art. For example, such additional filter media may be disposed in pouches sewn onto an interior surface of hopper 100.

Figure 7A:
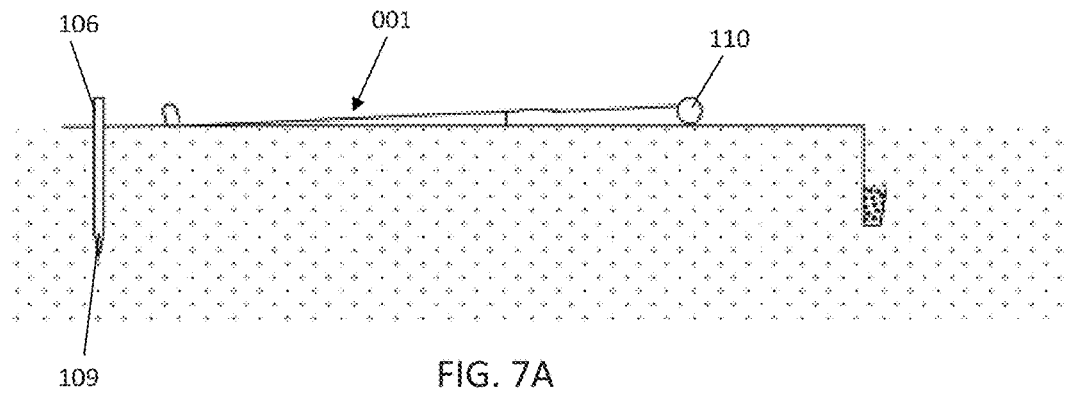
FIGS. 7A and 7B depict a cross sectional view of an erosion and storm water control apparatus of the invention installed using an installation ditch, and further depicting a direction of flow 002 of water 003 containing unwanted sediment or other particulate matter 004 entering the erosion and storm water control apparatus of the invention and being filtered such that substantially sediment-free storm water exits the curb filter of the invention in the direction of flow 002, and showing unwanted sediment 005 as being retained, and depicting the erosion and storm water control apparatus of the invention held in place by apron 200 buried in the installation ditch.
Figure 7B:
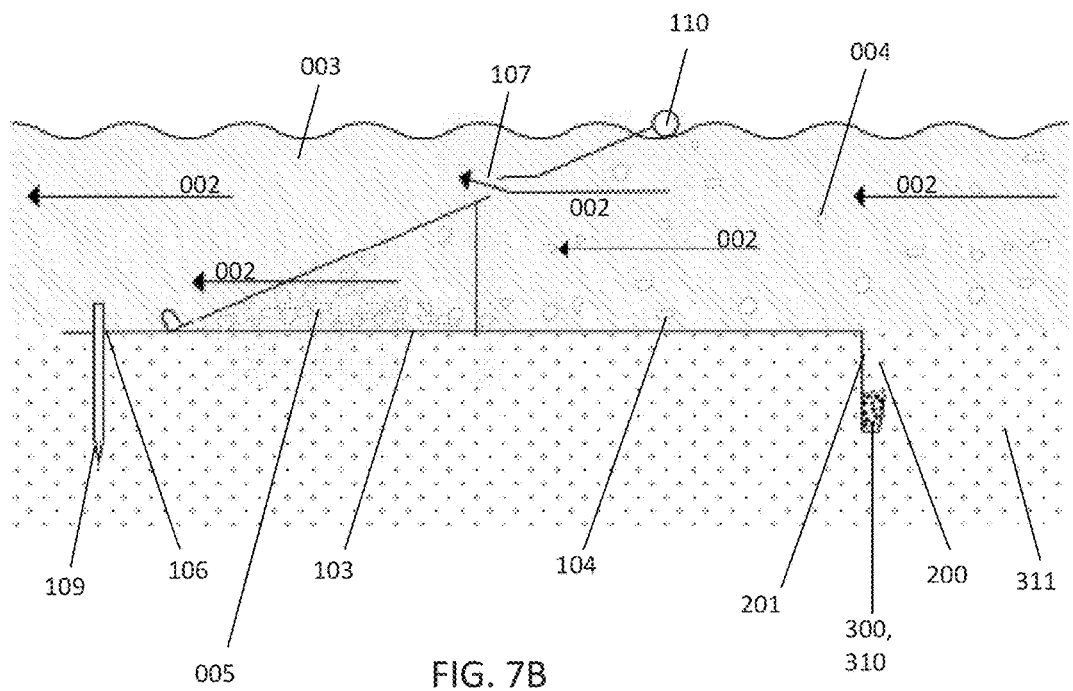
Figure 8:
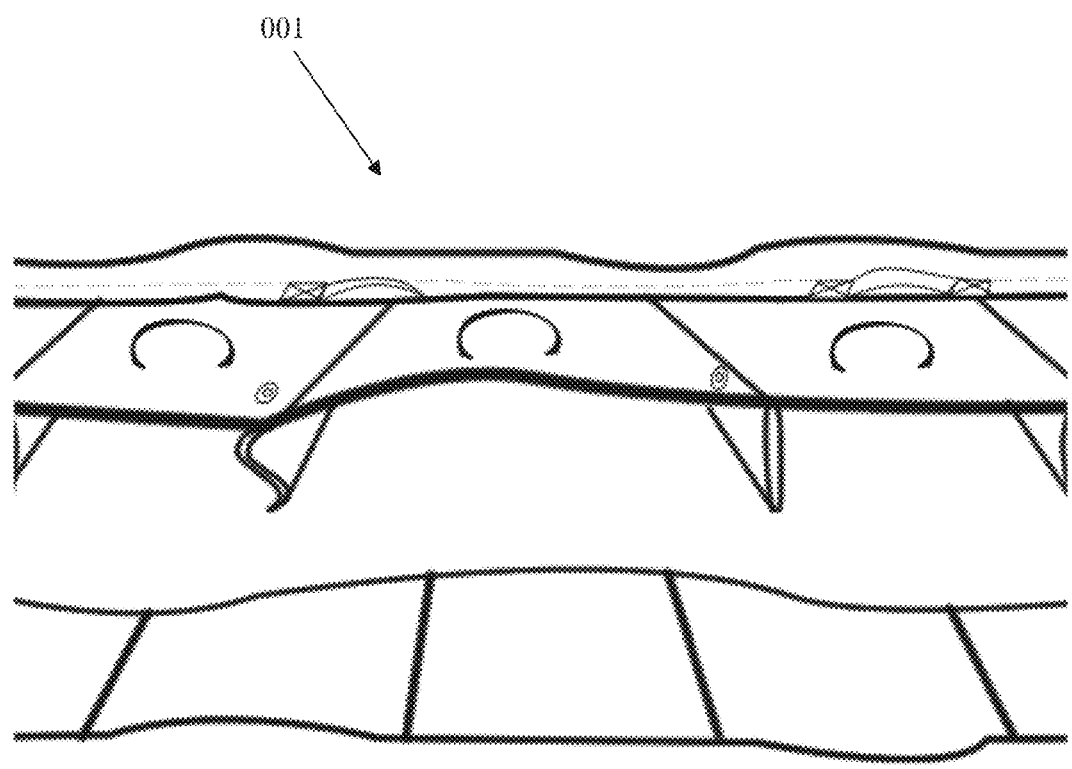
FIG. 8 depicts a photograph of an erosion and storm water control apparatus of the invention, as seen looking into the hopper of the invention.

Referring now to FIGS. 7A and 7B, a cross-section view of the erosion and storm water control apparatus 001 of the invention is depicted. In FIG. 7A, the erosion and storm water control apparatus is depicted in an installed state in which no storm water is entering the apparatus. In FIG. 7B, the erosion and storm water control apparatus is depicted in an installed state in which storm water containing sediment, debris, or other unwanted matter 004 is entering the apparatus in the direction of arrow 002. As the storm water enters the erosion and storm water control apparatus from the direction of arrow 002 it impacts the lower inner surface of hopper upper panel 101 water passes through the permeable filter fabric of hopper upper panel 101, but sediment and debris cannot pass through hopper upper panel 101. This causes the collection of unwanted sediment, debris and other matter 005 in the collection area of hopper 100. Filtered storm water continues to pass through hopper upper panel 101 by passing through the permeable filter fabric of hopper 101 as depicted by arrow 002 and also by passing through openings 107 in hopper upper panel 101. The filtered storm water exiting hopper upper panel 101 does so in the direction of arrows 002 and is free from unwanted sediment, debris, particulates or other matter. In this manner, the erosion and storm water control apparatus 001 of the invention filters unwanted matter from storm water and retains it in the V section of the apparatus where it may be removed at a later time, while allowing the filtered storm water to pass through the apparatus. Gussets 400 (not shown in FIG. 7A or 7B, but shown in FIG. 1A) operate to assist hopper 100 in remaining open during a period of water flow. The erosion and storm water control apparatus 001 is further assisted in remaining open during periods of water flow by operation of support member 110, which may be disposed within a retaining loop attached to, or part of, hopper upper panel 101, and running lengthwise along the upper edge of hopper 100 on the upstream side as depicted in FIG. 7B, thus creating a self-rising upper leading edge for hopper 100 that is comprised of a lighter-than-water support member fabricated from, for example, polyethylene foam, which may be disposed in a pocket of hopper upper panel 101 or attached to hopper upper panel by any means known in the art. Referring now to FIG. 7B, a cross sectional view of the erosion and storm water control apparatus 001 is depicted as installed, but with no storm water entering the apparatus. As can be seen in the figure, the apparatus lays relatively flat in such a condition. Stakes or other retaining apparatus' 109 may secure downstream apron 105 by passing through mounting openings 106, which may comprise grommets, and being secured in a surface such as the ground. Alternatively, mounting openings 106 may be utilized by any means known in the art to secure downstream apron 105 to an underlying surface or structure.

Figure 9:
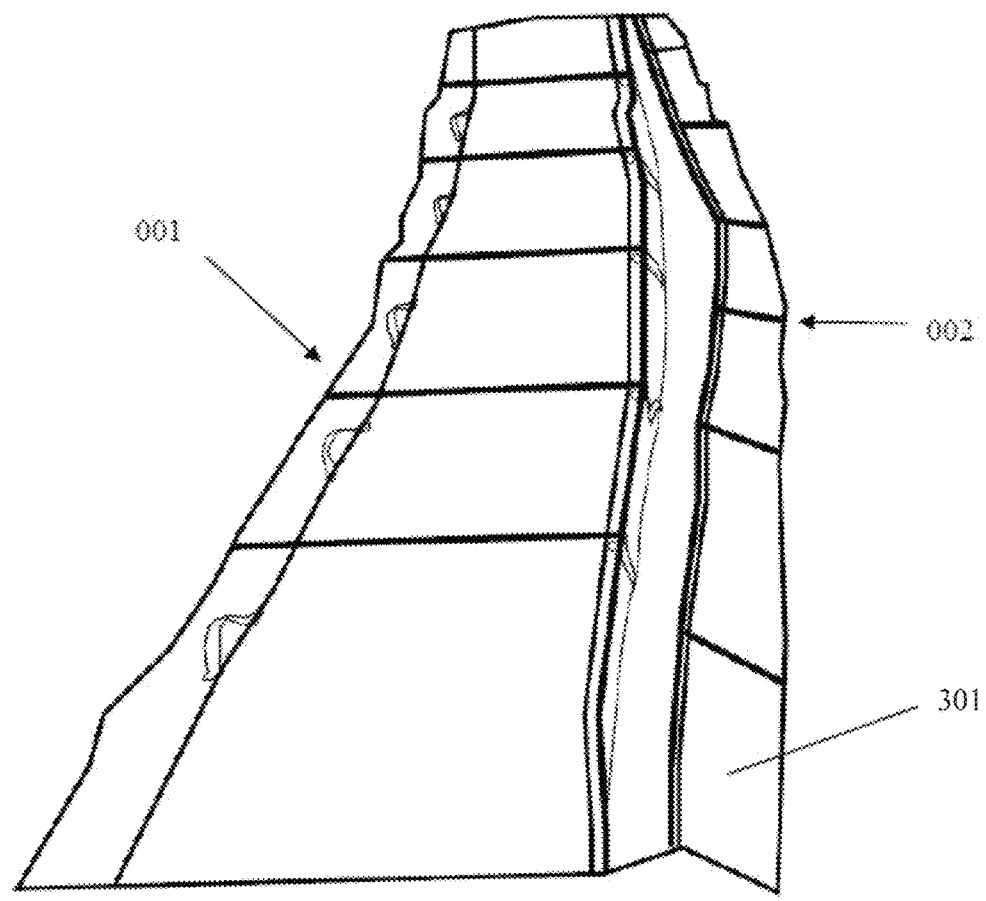
FIG. 9 depicts a photograph of an erosion and storm water control apparatus of the invention, as seen looking into onto the top of the invention, the invention being in an uninstalled state.
Figure 10:
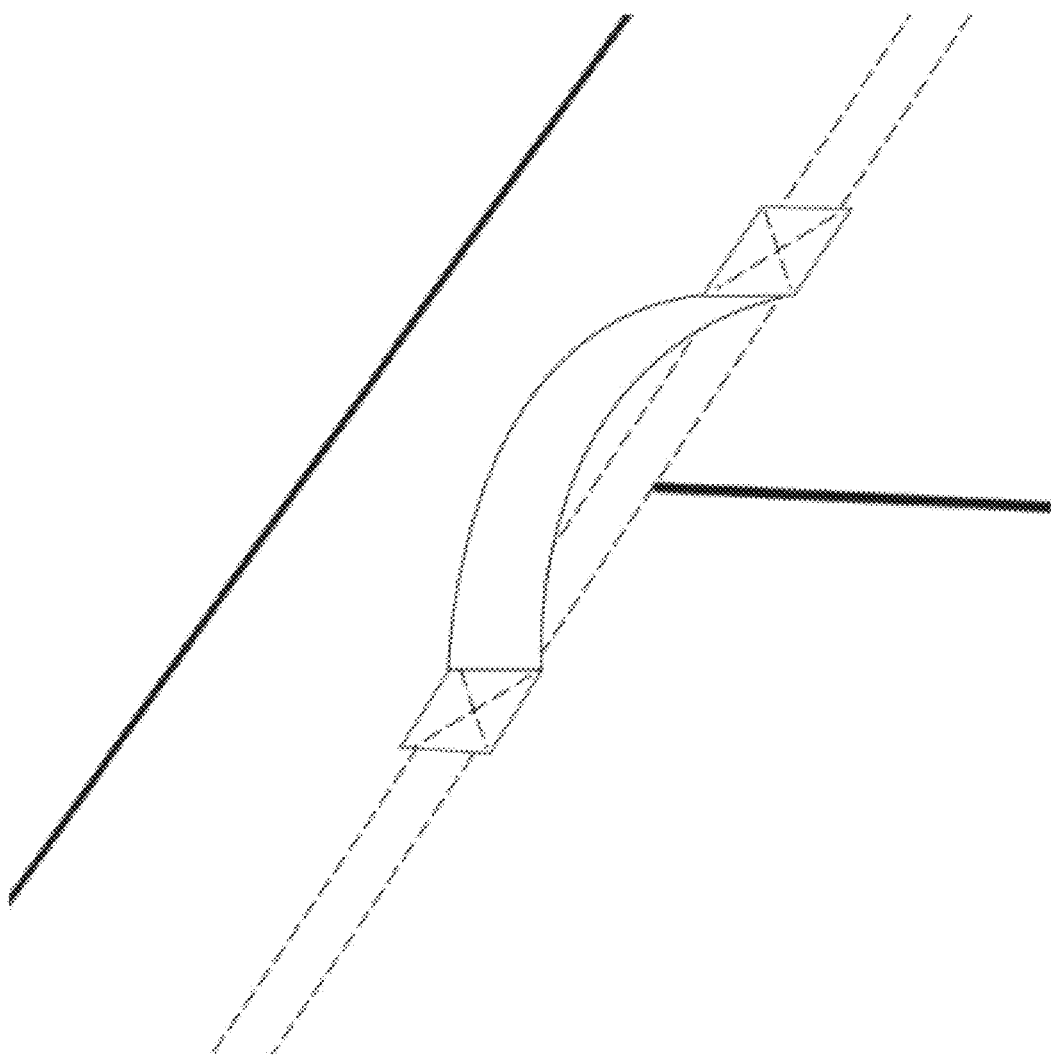
FIG. 10 depicts a photograph of a portion of an erosion and storm water control apparatus of the invention, showing the optional handle.
Figure 11:
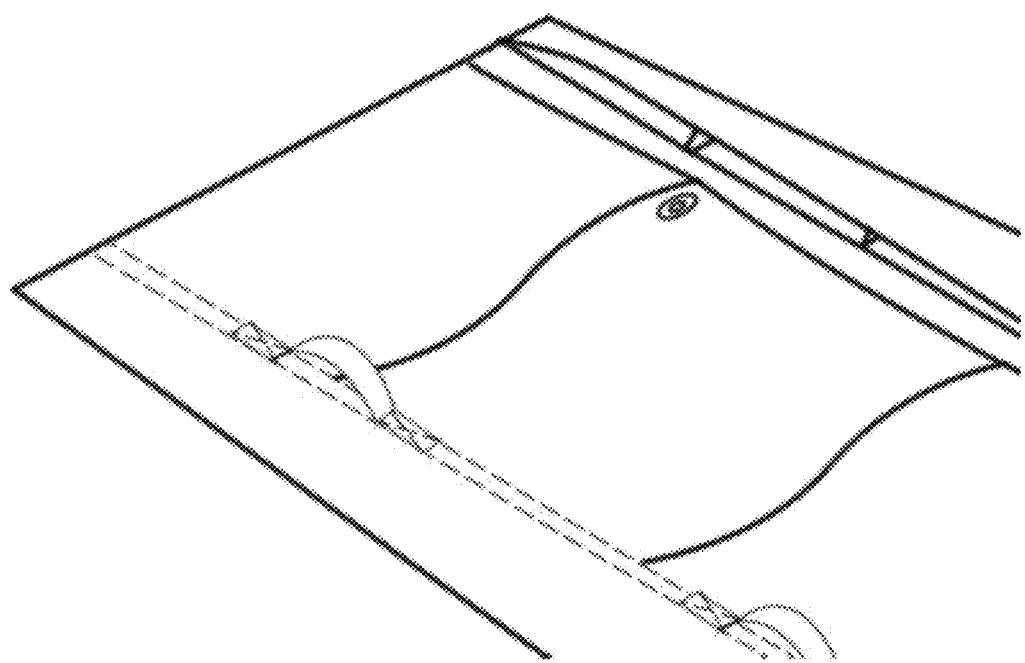
FIG. 11 depicts a photograph of a portion of an erosion and storm water control apparatus of the invention, showing the optional handle.

Referring now to FIGS. 8-11, FIG. 8 depicts a photograph of an erosion and storm water control apparatus of the invention, as seen looking into the hopper of the invention; FIG. 9 depicts a photograph of an erosion and storm water control apparatus of the invention, as seen looking into onto the top of the invention, the invention being in an uninstalled state; FIG. 10 depicts a photograph of a portion of an erosion and storm water control apparatus of the invention, showing the optional handle; and FIG. 11 also depicts a photograph of a portion of an erosion and storm water control apparatus of the invention, showing an optional handle.

Figure 12:
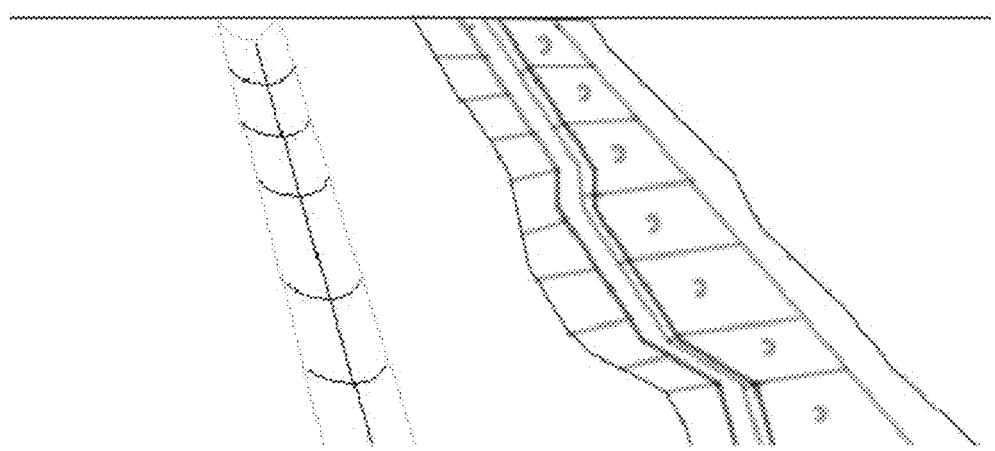
FIG. 12 depicts a photograph of an erosion and storm water control apparatus of the invention just before installation, showing the installation ditch.
Figure 13:
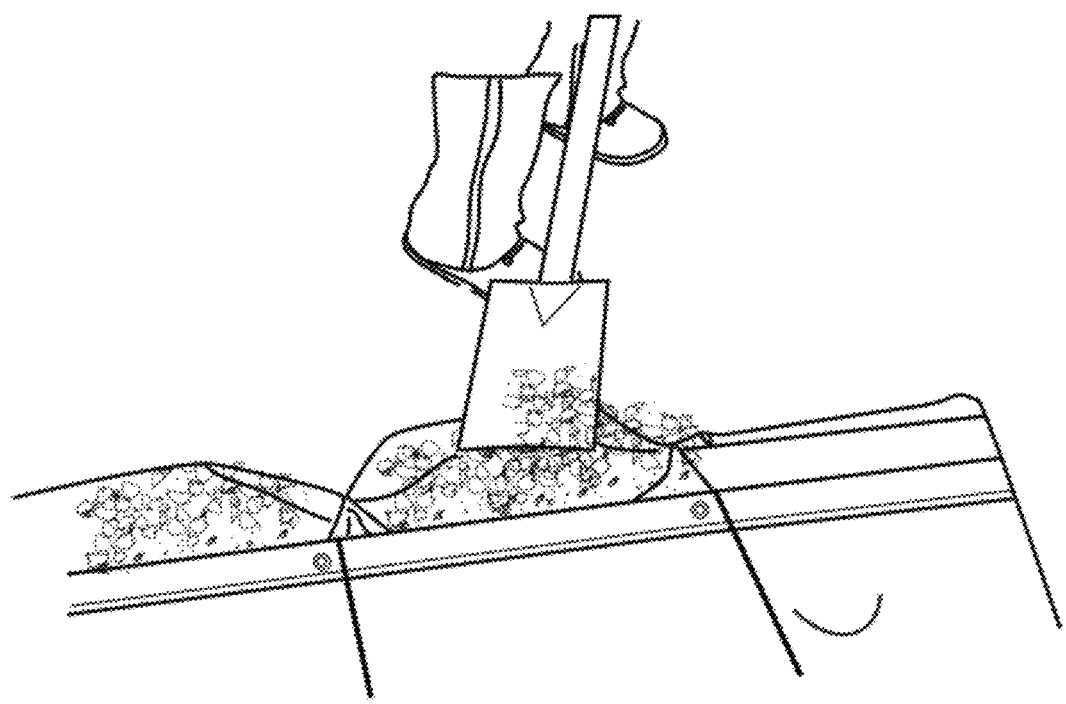
FIG. 13 depicts a photograph of a portion of an erosion and storm water control apparatus of the invention during installation, showing the filling of the pockets of the upstream apron being filled with dirt in order to anchor the apparatus.
Figure 14:
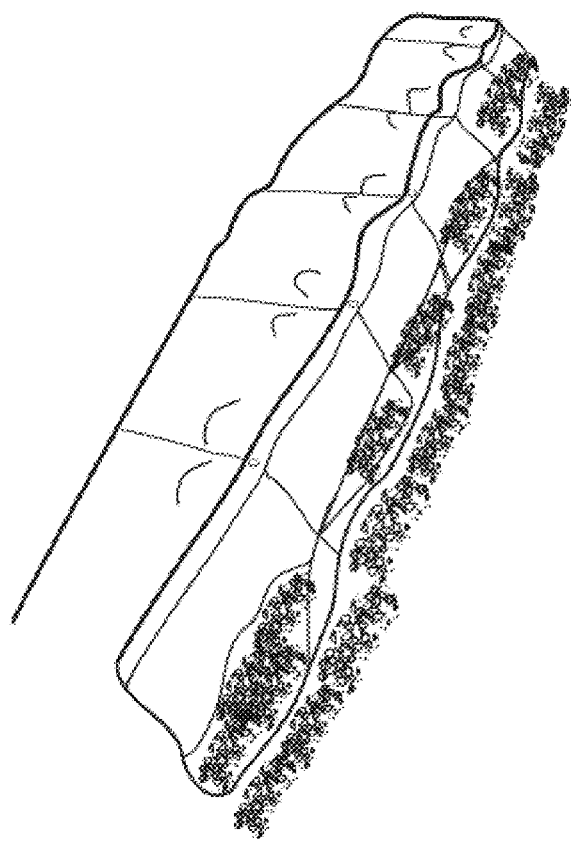
FIG. 14 depicts a photograph of a portion of an erosion and storm water control apparatus of the invention during installation, showing the pockets of the upstream apron filled with dirt in order to anchor the apparatus, and showing the upstream apron disposed in the installation ditch prior to covering the installation ditch with dirt.
Figure 15:
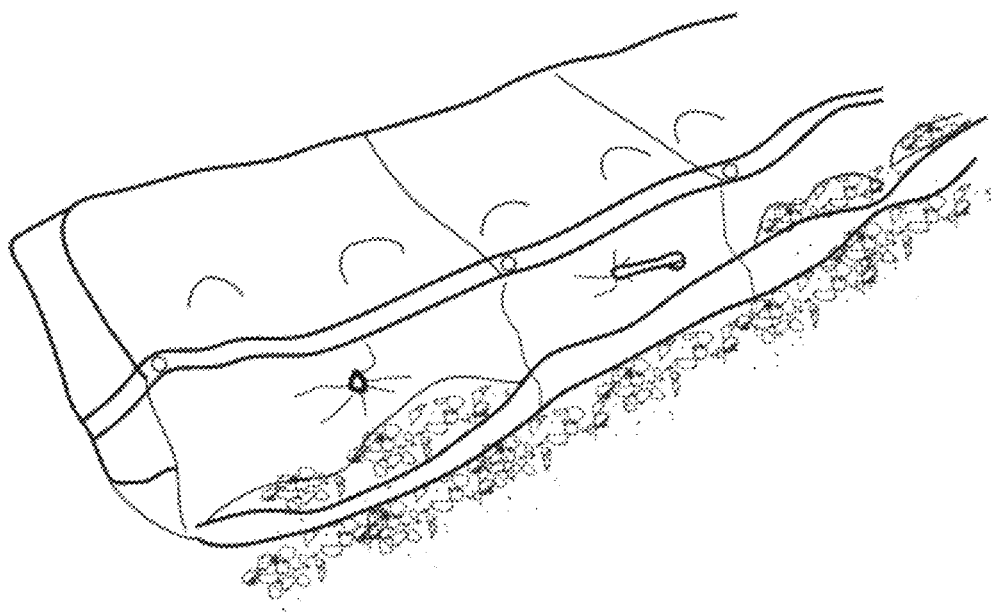
FIG. 15 depicts a photograph of a portion an erosion and storm water control apparatus of the invention during installation, showing the pockets of the upstream apron filled with dirt in order to anchor the apparatus, and showing the upstream apron disposed in the installation ditch prior to covering the installation ditch with dirt.
Figure 16:
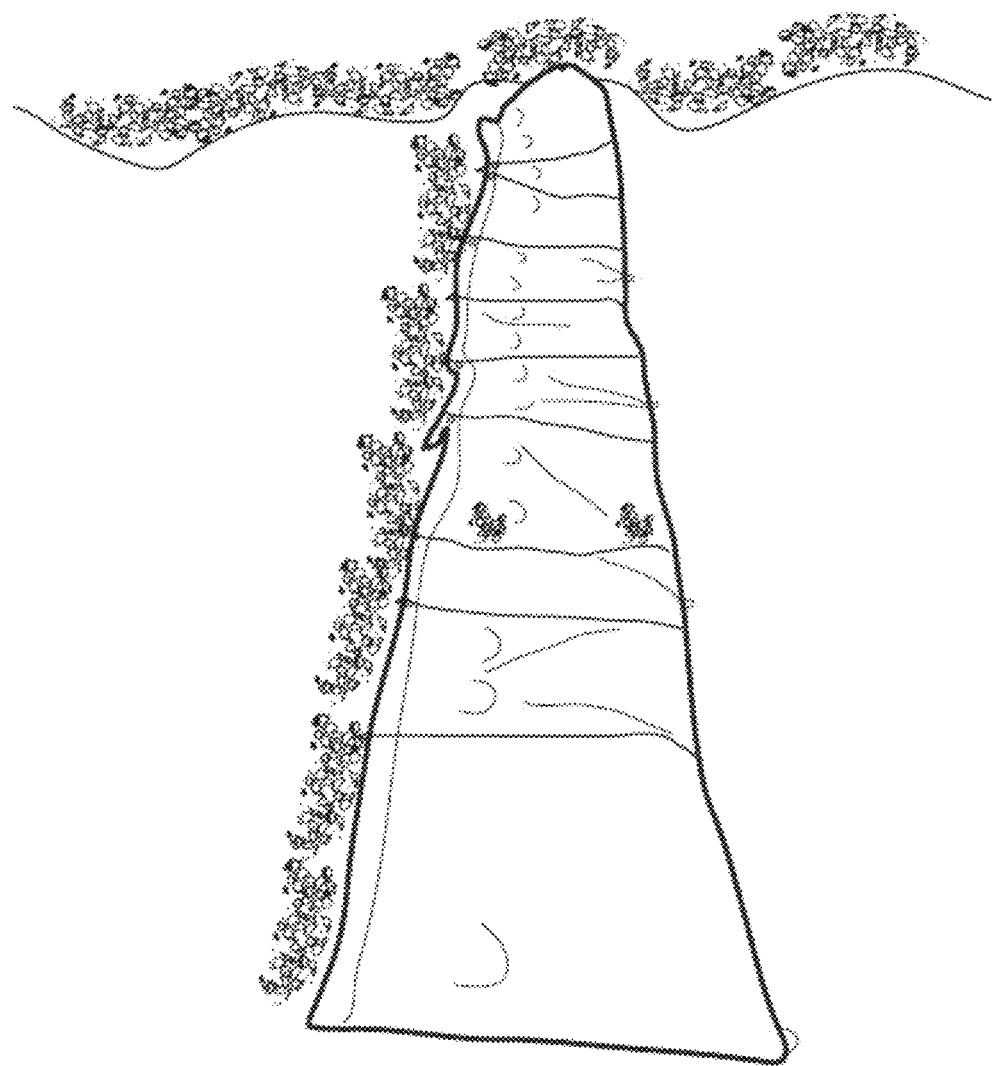
FIG. 16 depicts a photograph of a portion an erosion and storm water control apparatus of the invention after installation, showing the upstream apron disposed in the installation ditch after covering the installation ditch with dirt.

Referring now to FIGS. 12-16, Upstream apron 200 and pockets 300 may be utilized to secure the erosion and storm water control apparatus 001 to the ground by digging a trench longer that the length of the erosion and storm water control apparatus 001, where the trench may be approximately four inches wide and twelve inches deep and is transverse to the expected water flow in an area to protected from erosion as depicted in FIG. 12; laying the erosion and storm water control apparatus 001 lengthwise along the trench as depicted in FIG. 12; filling pockets 300 with dirt, gravel, or other material as depicted in FIGS. 13 and 14; inserting pockets 300 into the trench for the length of the storm water control apparatus 001 as depicted in FIG. 15; and filling dirt, rocks or the like on top of the trench and upstream apron to complete the installation as depicted in FIG. 16.

In the embodiments depicted in the figures, six hopper cells 109 are depicted. However, the invention may comprise any number of hopper cells. Furthermore, all dimensions depicted in the figures or taught in the specification are exemplary only. Thus the invention may comprise any number of hopper cells 109 and may take on any dimension as desired by a user.

What is claimed is:

1. An erosion and storm water control apparatus, comprising:
   a hopper comprising an upper panel, a lower panel, a back panel, and two side panels, wherein said hopper comprises at least one cell enclosing a volume and having an upstream opening;
   an upstream apron attached lengthwise to said lower upstream edge of said hopper; and
   a downstream apron attached lengthwise to said lower downstream edge of said hopper, said downstream apron containing anchor points:
   wherein:
   said upstream apron comprises at least one pocket.

2. The erosion and storm water control apparatus of claim 1, wherein said at least one cell is defined as a plurality of cells separated by a gusset.

3. The erosion and storm water control apparatus of claim 2, further comprising a support member extending lengthwise along an upper upstream edge of said hopper, said support member being lighter than water.

4. The erosion and storm water control apparatus of claim 3, wherein said support member is further defined as comprising polyethylene foam.

5. The erosion and storm water control apparatus of claim 2, wherein said hopper is fabricated from permeable filter fabric.

6. The erosion and storm water control apparatus of claim 5 wherein said permeable filter fabric is further defined to be selected from the group consisting of four, eight, ten, or twelve oz. non-woven geotextile fabric.

7. The erosion and storm water control apparatus of claim 1, wherein said at least one cell is defined as having a V cross section.

8. The erosion and storm water control apparatus of claim 7, wherein said hopper is fabricated from permeable filter fabric.

9. The erosion and storm water control apparatus of claim 8 wherein said permeable filter fabric is further defined to be selected from the group consisting of four, eight, ten, or twelve oz. non-woven geotextile fabric.

10. The erosion and storm water control apparatus of claim 1, wherein said hopper is fabricated from permeable filter fabric.

11. The erosion and storm water control apparatus of claim 10 wherein said permeable filter fabric is further defined to be selected from the group consisting of four, eight, ten, or twelve oz. non-woven geotextile fabric.

12. The erosion and storm water control apparatus of claim 10, wherein said upper panel further comprises openings in an upper portion thereof for allowing water to pass through said hopper without be filtered.

13. The erosion and storm water control apparatus of claim 1, further comprising a support member extending lengthwise along an upper upstream edge of said hopper, said support member being lighter than water.

14. The erosion and storm water control apparatus of claim 13, wherein said support member is further defined as comprising polyethylene foam.

15. A method for preventing erosion and preventing runoff of storm water containing unwanted material, comprising the steps of:
   providing an erosion control apparatus filter comprising:
      a hopper comprising an upper panel, a lower panel, a back panel, and two side panels, wherein said hopper comprises at least one cell enclosing a volume and having an upstream opening;
      an upstream apron attached lengthwise to said lower upstream edge of said hopper; and
      a downstream apron attached lengthwise to said lower downstream edge of said hopper, said downstream apron containing anchor points:
      wherein:
      said upstream apron comprises at least one pocket, and said upstream apron having a length;
   digging a trench for accepting said at least one pocket, said trench being longer than said upstream apron length and said trench running transverse to an expected flow of storm water;
   filling said at least one pocket with a weighty material, thereby creating at least one filled pocket;
   inserting said at least one filled pocket into said trench;
   covering said trench with dirt; and
   passing storm water containing unwanted materials into said hopper for filtering said unwanted materials.

16. The method for preventing erosion and preventing runoff of storm water of claim 15, wherein said hopper is fabricated from permeable filter fabric.

17. The method for preventing erosion and preventing runoff of storm water of claim 16, wherein said permeable filter fabric is further defined to be selected from the group consisting of four, eight, ten, or twelve oz. non-woven geotextile fabric.

18. The method for preventing erosion and preventing runoff of storm water of claim 16, further comprising the step of anchoring said downstream apron to an underlying surface or structure using said anchor points.

19. The method for preventing erosion and preventing runoff of storm water of claim 15, further comprising the step of inserting water permeable containers into said hopper, said water permeable containers containing flocculants, coagulants, extra activated charcoal filters, heavy metal filters or hydrocarbon filters in any combination.

\* \* \* \* \*